United States Patent
Thielo et al.

(10) Patent No.: US 7,949,799 B2
(45) Date of Patent: May 24, 2011

(54) STORAGE APPARATUS, AND METHOD OF STOPPING OPERATION OF ADD-ON STORAGE DEVICE WHICH IS IN OPERATION WITHIN THE STORAGE APPARATUS

(75) Inventors: Oumar Thielo, Kawasaki (JP); Atsuhiro Otaka, Kawasaki (JP); Hidetoshi Satou, Kawasaki (JP); Yukihiro Yoshiya, Kawasaki (JP); Nobuyuki Honjo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 243 days.

(21) Appl. No.: 12/196,780

(22) Filed: Aug. 22, 2008

(65) Prior Publication Data
US 2009/0063723 A1 Mar. 5, 2009

(30) Foreign Application Priority Data
Aug. 27, 2007 (JP) .................. 2007-220259

(51) Int. Cl.
G06F 3/00 (2006.01)
G06F 1/00 (2006.01)
G06F 15/167 (2006.01)
G06F 11/00 (2006.01)
G05D 3/12 (2006.01)

(52) U.S. Cl. .......... 710/18; 700/286; 713/340; 709/212; 714/43

(58) Field of Classification Search .............. 710/18; 700/286; 713/340; 709/212; 714/43
See application file for complete search history.

(56) References Cited

U.S. PATENT DOCUMENTS

| 5,898,880 A * | 4/1999 | Ryu .............................. 713/323 |
| 5,905,994 A * | 5/1999 | Hori et al. ...................... 711/113 |
| 6,728,601 B2 * | 4/2004 | Garcia et al. .................. 700/286 |

FOREIGN PATENT DOCUMENTS

| JP | 01-197822 | 8/1989 |
| JP | 10-143293 | 5/1998 |
| JP | 2001-339853 | 7/2001 |
| JP | 2003-162380 | 6/2003 |

OTHER PUBLICATIONS

Japanese Office Action dated Aug. 18, 2009.

* cited by examiner

*Primary Examiner* — Henry W Tsai
*Assistant Examiner* — Juanito C Borromeo
(74) *Attorney, Agent, or Firm* — Staas & Halsey LLP

(57) ABSTRACT

A storage apparatus and method are provided. The storage apparatus including includes a basic storage device having a control unit and an add-on storage device configured to be connected to the basic storage device. The add-on storage device including a first request receiving unit receiving a first operation stop request output from the basic storage device to the add-on storage device second request receiving unit receiving a second operation stop request different from the first operation stop request, communication monitoring unit monitoring communication from the basic storage device, and operation stop processing unit performing processing for stopping the operation of the add-on storage device. The operation stop processing unit determines the validity of the second operation stop request on the basis of a monitoring result obtained by the communication monitoring unit, and stops the operation of the add-on storage device.

10 Claims, 6 Drawing Sheets

STORAGE APPARATUS, AND METHOD OF STOPPING OPERATION OF ADD-ON STORAGE DEVICE WHICH IS IN OPERATION WITHIN THE STORAGE APPARATUS

CROSS-REFERENCE TO RELATED APPLICATIONS

This application is related to and claims priority to Japanese patent application no. 2007-220259 filed on Aug. 27, 2007 in the Japan Patent Office, and incorporated by reference herein.

BACKGROUND

1. Field

The embodiments discussed herein are directed to a storage apparatus including a storage including a control unit and an additional storage medium. and a method of stopping an operation of a storage device.

2. Description of the Related Art

Storage apparatuses including a basic storage device including a control unit for controlling external access and a storage medium, and an add-on storage device including an additional storage medium, in which a large capacity can be realized by connecting the add-on storage device to the basic storage device, have been available.

Since the basic storage device and the add-on storage device can be implemented as separate devices, the power supply of the basic storage device and the power supply of the add-on storage device are generally separately managed.

Japanese Unexamined Patent Application Publication No. 2001-339853 discloses a technique in which a basic storage device is provided with a function of managing the power supply of an add-on storage device so that the basic storage device can provide unified management of its power supply and the power supply of the add-on storage device is known. According to this technique, for example, once a user presses a stop button of the basic storage device, the operation of the basic storage device which is in operation is stopped and the operation of the add-on storage device which is in operation is also stopped.

This technique may not require a user to press a stop button of each of a plurality of add-on storage devices that are in operation to stop the operation of the plurality of add-on storage devices to improve operability. Preventing an occurrence of failure in a storage apparatus due to accidental termination of an add-on storage device caused by an accident such as a user's erroneous operation when the storage apparatus is being accessed from the outside may also be achieved.

This technique can f be used so a storage apparatus having connected therein an add-on storage device does not include a start button or stop button. Therefore, the cost required to provide a start button or stop button on an add-on storage device can be reduced, and risk of erroneous operation for an add-on storage device reduced.

However, where a basic storage device, for example, performs unified power-supply management, there can be problems, for example, in that if the basic storage device has failed, e operation of an add-on storage device in operation may not be stopped.

SUMMARY

In is an aspect of the embodiments discussed herein to provide a storage apparatus including a basic storage device having a control unit configured to control external access and an add-on storage device configured to be connected to the basic storage device. The add-on storage device includes a first request receiving unit receiving a first operation stop request output from the basic storage device to the add-on storage device second request receiving unit receiving a second operation stop request different from the first operation stop request, received by the first request receiving unit communication monitoring unit monitoring communication from the basic storage device or a second add-on storage device, and operation stop processing unit performing processing for stopping the operation of the add-on storage device when the first request receiving unit receives the first operation stop request. The operation stop processing unit determines the validity of the second operation stop request received by the second request receiving unit based on a monitoring result obtained by the communication monitoring unit, and stops the operation of the add-on storage device when the second request receiving unit receives a valid second operation stop request.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Figure 1:
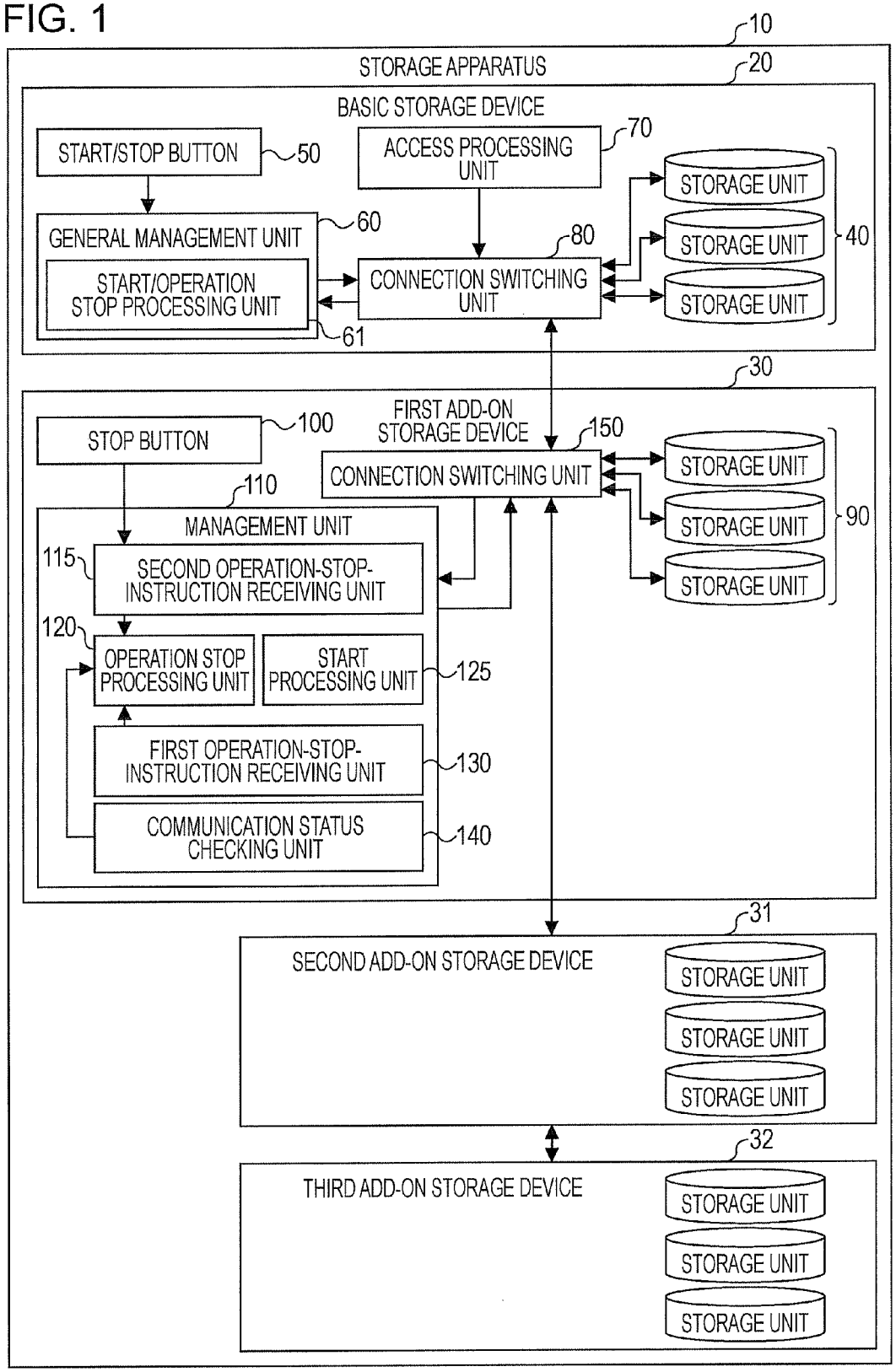
FIG. 1 illustrates a storage apparatus according to a first embodiment.

Reference will now be made in detail to the embodiments, examples of which are illustrated in the accompanying drawings, wherein like reference numerals refer to the like elements throughout. The embodiments are described below to explain the present invention by referring to the figures.

FIG. 1 illustrates a storage apparatus 10 according to an embodiment. As illustrated in FIG. 1, the storage apparatus 10 includes a basic storage device 20, a first add-on storage device 30, a second add-on storage device 31, and a third add-on storage device 32, which can be connected to one another. The number of add-on storage devices may not necessarily be three, and any number of add-on storage devices may be connected in accordance with a capacity to realize a large capacity of the storage apparatus 10. A user can read and write data from and to a storage medium provided in the basic storage device 20 and a storage medium provided in each additional add-on storage device. External accesses to storage media are controlled by the basic storage device 20 and may be managed in a unified manner.

In the storage apparatus 10, a device connected nearer to the basic storage device 20 than a given add-on storage device can be defined as an upstream-side device for the given add-on storage device. For example, the basic storage device 20 is an upstream-side device for the first add-on storage device 30. For example, the basic storage device 20 or the first add-on storage device 30 is an upstream-side device for the second add-on storage device 31.

A basic storage device 20 and an add-on storage device are described. An add-on storage device is described in the context of the first add-on storage device 30 because the first add-on storage device 30, the second add-on storage device 31, and the third add-on storage device 32 can have a similar structure.

As illustrated in FIG. 1, the basic storage device 20 includes storage units 40, a start/stop button 50, a general management unit 60, an access processing unit 70, and a connection switching unit 80.

The storage units 40 may be storage media storing predetermined data. As described above, in case of a shortage of the capacity of the storage units 40, an add-on storage device may be connected to the basic storage device 20 so that a storage medium provided in the add-on storage device can complement the storage units 40.

The start/stop button 50 receives a request from a user to start or stop the basic storage device 20. When the start/stop button 50 is operated by a user, a predetermined control signal (a start request signal or stop request signal) is output to a start/operation stop processing unit 61 of the general management unit 60.

The general management unit 60 is a processing unit for managing the overall operation of the storage apparatus 10, and includes the start/operation stop processing unit 61. The general management unit 60 manages the starting and stopping of each add-on storage device using the start/operation stop processing unit 61, and may also manages various conditions of each add-on storage device (for example, whether the temperature is kept constant) using a predetermined control signal. In this case, the general management unit 60 transmits the control signal to a management unit of an add-on storage device to be managed, and therefore instructs each connection switching unit to establish a transmission path. After a predetermined transmission path is maintained, the control signal is transmitted.

The start/operation stop processing unit 61 performs processing relating to the starting and stopping of the basic storage device 20, and controls the starting and stopping of each connected add-on storage device. Specifically, upon receiving a start request signal output from the start/stop button 50, the start/operation stop processing unit 61 causes the basic storage device 20 to start, and transmits a start request signal to each add-on storage device. Upon receiving a stop request signal output from the start/stop button 50, the start/operation stop processing unit 61 causes the basic storage device 20 which is in operation to stop. The start/operation stop processing unit 61 further transmits a stop request signal to each add-on storage device.

The access processing unit 70 controls external access to the storage apparatus 10. Specifically, upon receiving a data write request from outside, the access processing unit 70 instructs each connection switching unit to establish a path to enable access to a write-target storage unit. After the paths are established, data is written in the storage unit from the outside.

The connection switching unit 80 is controlled by the general management unit 60 or the access processing unit 70 to establish a path to allow transmission of a control signal or data.

The first add-on storage device 30 will now be described with reference to FIG. 1. The first add-on storage device 30 includes storage units 90, a stop button 100, a management unit 110, and a connection switching unit 150.

The storage units 90 are media storing predetermined data. As described above, in case of a shortage of the capacity of the storage units 40, the storage units 40 are complemented by the storage units 90.

The stop button 100 receives a request from a user to stop the first add-on storage device 30. Specifically, when the stop button 100 is operated by a user, a stop request signal is output to a second operation-stop-instruction receiving unit 115 of the management unit 110, which is described later.

The management unit 110 is a processing unit for managing the state of the first add-on storage device 30. The management unit 110 includes the second operation-stop-instruction receiving unit 115, an operation stop processing unit 120, a start processing unit 125, a first operation-stop-instruction receiving unit 130, and a communication status checking unit 140.

For example, in a case where the temperature of the device (or any other condition to be managed) has an abnormal value, the management unit 110 may notify s the general management unit 60 of the occurrence of abnormality using a predetermined control signal. In this case, in order to transmit the control signal to the general management unit 60, the management unit 110 instructs each connection switching unit to establish a transmission path. After a predetermined transmission path is maintained, the control signal may be transmitted.

The start processing unit 125 performs processing relating to the starting of the first add-on storage device 30. Specifically, upon receiving a start request signal transmitted from the start/operation stop processing unit 61 through the connection switching units 80 and 150, the start processing unit 125 causes the first add-on storage device 30 to start.

The first operation-stop-instruction receiving unit 130 receives a first stop request signal transmitted to the first add-on storage device 30 from the basic storage device 20. The first operation-stop-instruction receiving unit 13Q receives a stop request signal transmitted from the start/operation stop processing unit 61 through the connection switching units 80 and 150. Then, the first operation-stop-instruction receiving unit 130 outputs the received stop request signal to the operation stop processing unit 120.

The second operation-stop-instruction receiving unit 115 receives a second stop request signal different from the first stop request signal received by the first operation-stop-instruction receiving unit 130. The second operation-stop-instruction receiving unit 115 receives a stop request signal output from the stop button 100 as a second stop request signal, and outputs the received stop request signal to the operation stop processing unit 120.

The communication status checking unit 140 monitors communication from the basic storage device 20 connected upstream of the first add-on storage device 30 or another add-on storage device. The communication status checking unit 140 checks a reception state of a control signal that is transmitted at a predetermined timing from the general management unit 60 of the basic storage device 20.

The control signal transmitted at the predetermined timing from the general management unit 60 of the basic storage device 20 is described with reference to FIGS. 2 and 3. FIGS.

2 and 3 illustrate an example of an operation performed between two devices which are in operation.

Figure 2:
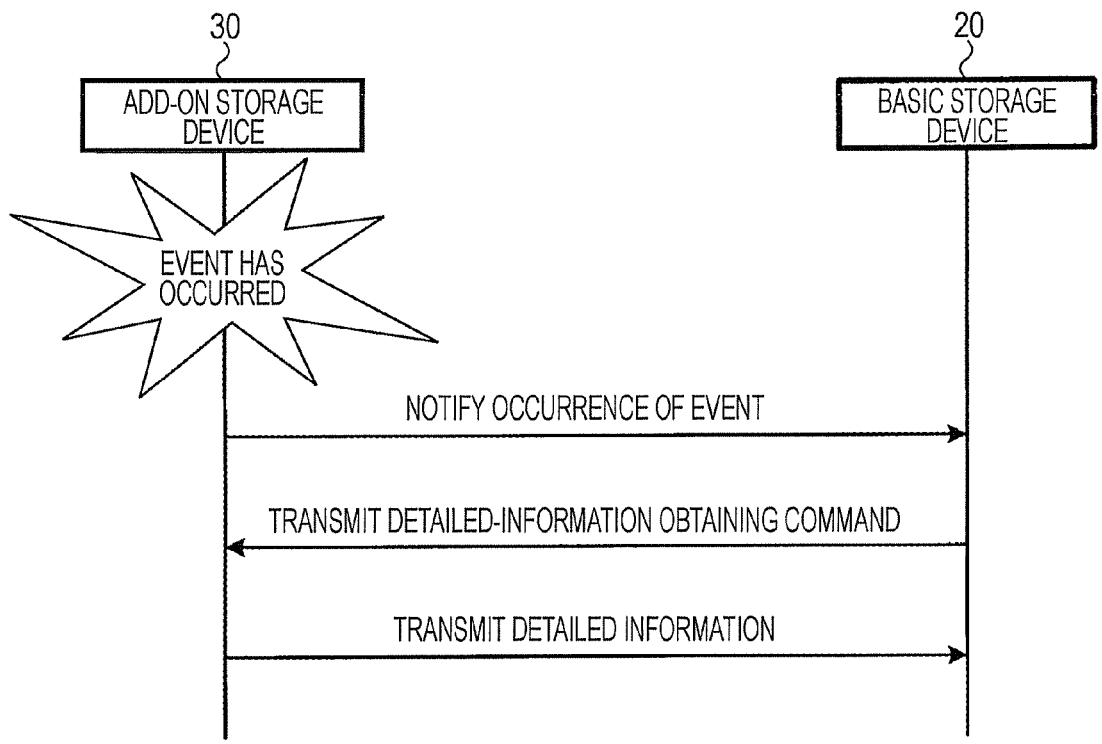
FIG. 2 illustrates an example of an operation performed between two devices.

As illustrated in FIG. 2, in a case where a predetermined event has occurred in the first add-on storage device 30, the management unit 110 notifies the basic storage device 20 of the occurrence of the event. The predetermined event may be an event in which, for example, the temperature of the first add-on storage device 30, the rotational speed of a fan provided in a housing forming the first add-on storage device 30, the voltage applied to a predetermined element, or the like has an abnormal value.

Upon receiving the notification of the occurrence of the event, the general management unit 60 of the basic storage device 20 transmits a detailed-information obtaining command to the first add-on storage device 30. The detailed-information obtaining command is an example of the control signal transmitted at the predetermined timing.

Upon receiving the detailed-information obtaining command, the management unit 110 generates detailed information indicating the temperature of the first add-on storage device 30 or the like, and transmits the detailed information to the basic storage device 20.

Figure 3:
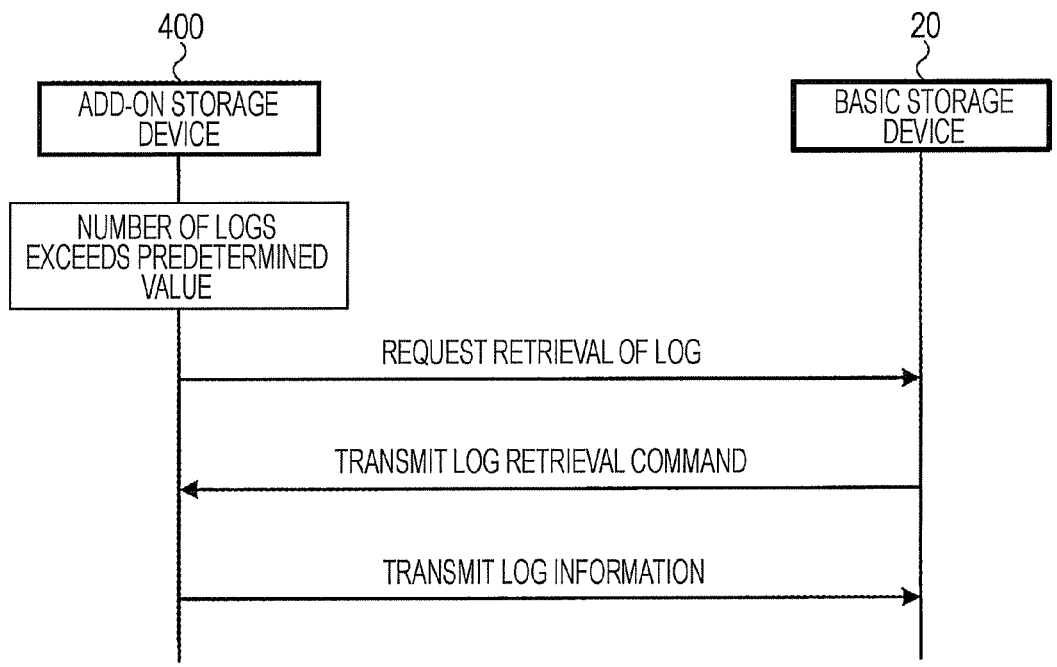
FIG. 3 illustrates an example of an operation performed between two devices.

As illustrated in FIG. 3, furthermore, in a case where the number of logs stored in a predetermined storage unit (not illustrated) provided in the first add-on storage device 30 exceeds a predetermined value, the management unit 110 requests the basic storage device 20 to retrieve the logs. The term "log" can be defined as a record that is made by the management unit 110 in response to a change in the first add-on storage device 30, such as the date and time at which the storage units 90 of the first add-on storage device 30 were accessed.

Upon receiving the request to retrieve the logs, the general management unit 60 of the basic storage device 20 transmits a log retrieval command to the first add-on storage device 30. The log retrieval command is an example of the control signal transmitted at the predetermined timing.

Upon receiving the log retrieval command, the management unit 110 reads log information, and transmits the read log information to the basic storage device 20.

Accordingly, the communication status checking unit 140 checks the reception state of the control signal transmitted at the predetermined timing from the general management unit 60 of the basic storage device 20. Each add-on storage device does not necessarily receive the control signal directly from the basic storage device 20. For example, the second add-on storage device 31 or the third add-on storage device 32 is connected in the manner illustrated in FIG. 1, and thus receives the control signal via another add-on storage device. That is, in FIG. 1, the second add-on storage device 31 receives, from the first add-on storage device 30, the control signal transmitted from the general management unit 60.

In a case where no control signal is received at an appropriate receiving timing as a result of the checking of the reception state of the control signal, the communication status checking unit 140 outputs a predetermined control signal to the operation stop processing unit 120.

The operation stop processing unit 120 performs processing for stopping the operation of the first add-on storage device 30 if the first operation-stop-instruction receiving unit 130 receives a first stop request signal.

That is, the stop request signal received by the first operation-stop-instruction receiving unit 130 is a stop request signal that is transmitted from the start/operation stop processing unit 61 of the basic storage device 20.

Upon receiving this stop request signal, the operation stop processing unit 120 absolutely performs processing to stop the operation of the first add-on storage device 30.

The operation stop processing unit 120 further determines the validity of the second stop request signal received by the second operation-stop-instruction receiving unit 115 based on the monitoring result obtained by the communication status checking unit 140. If the second operation-stop-instruction receiving unit 115 has received a valid second stop request signal, the operation stop processing unit 120 performs the processing for stopping the operation of the first add-on storage device 30.

That is, the second stop request signal received by the second operation-stop-instruction receiving unit 115 is a stop request signal that is output from the stop button 100.

The operation stop processing unit 120 determines that the second stop request signal is invalid until the predetermined control signal output from the communication status checking unit 140 has been received. If a user presses the stop button 100 in this state, the first add-on storage device 30 which is in operation is not stopped.

Once the predetermined control signal output from the communication status checking unit 140 has been received, however, the operation stop processing unit 120 determines that the basic storage device 20 is in failure, and determines that a second stop request signal thereafter is valid. If a user presses the stop button 100 in this state, the first add-on storage device 30 which is in operation is stopped.

The connection switching unit 150 is controlled by the management unit 110 or the access processing unit 70 to establish a path to allow transmission of a control signal or data.

Figure 4:
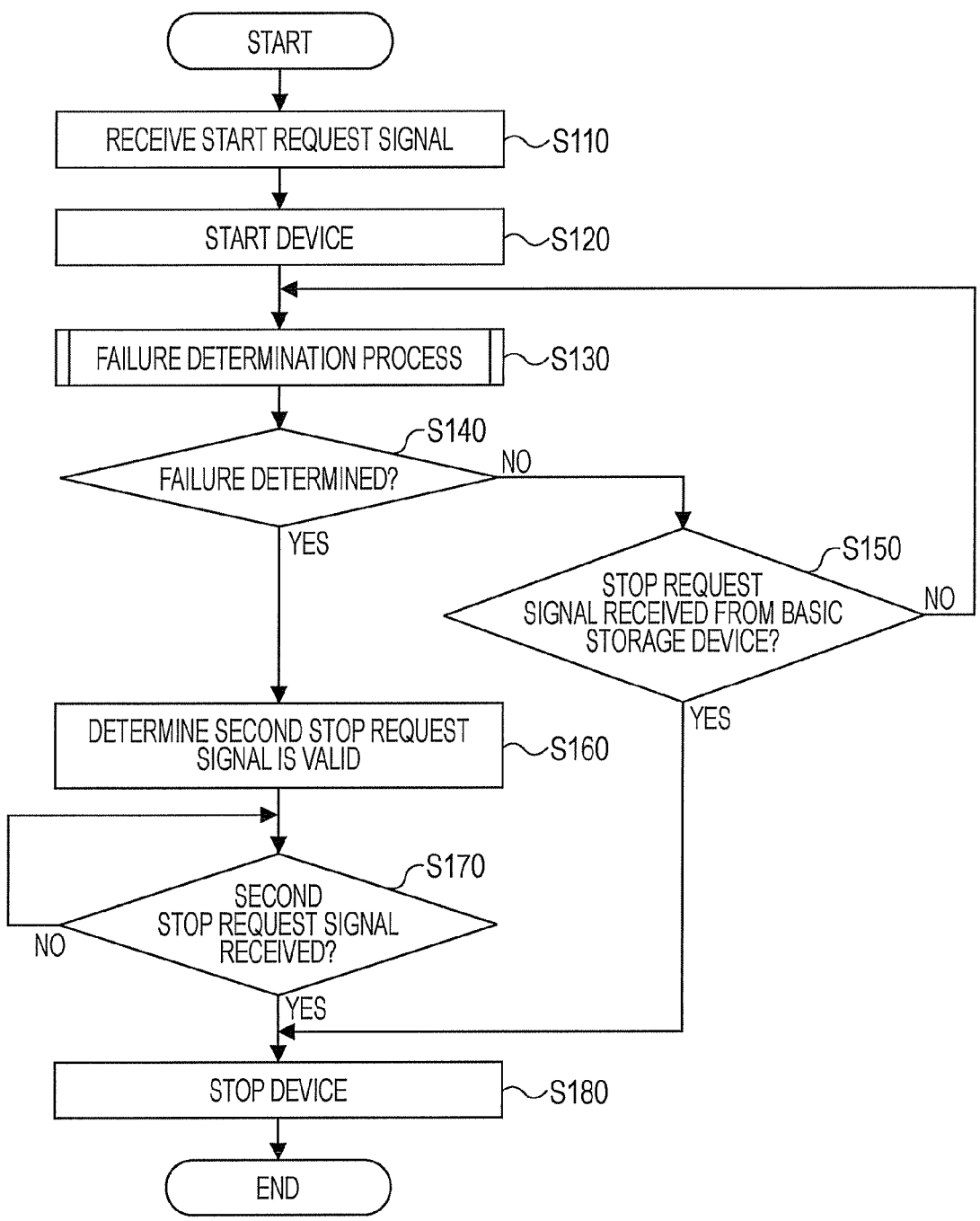
FIG. 4 illustrates process relating to the starting and stopping of an add-on storage device.

Next, the starting and stopping of an add-on storage device, and a process relating to the starting and stopping of the add-on storage device will be described with reference FIG. 4. FIG. 4 illustrates a process relating to the starting and stopping of an add-on storage device.

As illustrated in FIG. 4, an add-on storage device 400 receives a start request signal from the basic storage device 20 (operation S110), and starts its operation (operation S120).

Then, the add-on storage device performs failure determination processing of determining whether the basic storage device 20 is in failure, which is constantly performed during the operation of the add-on storage device (operation S130).

If it is determined that the basic storage device 20 is not in failure (NO in operation S140), the add-on storage device stops its operation (operation S180) upon receipt of a stop request signal from the basic storage device 20 (YES in operation S150).

If it is determined in operation S140 that the basic storage device 20 is in failure (YES in operation S140), the add-on storage device determines a second stop request signal is valid (operation S160).

Then, upon receiving a second stop request signal transmitted by operating the stop button 100 (YES in operation S170), the add-on storage device stops its operation (operation S180). Then, the process ends.

The failure determination process of operation S130 illustrated in FIG. 4 will now be described in further detail. FIGS. 5, 6, 7, and 8 are flowcharts illustrate examples of a failure determination process.

Figure 5:
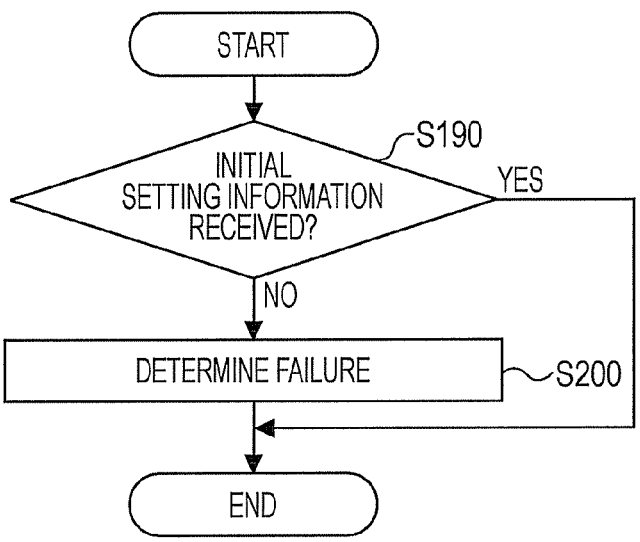
FIG. 5 illustrates an example of a failure determination process.

As illustrated in FIG. 5, if initial setting information transmitted from the basic storage device 20 at the startup time is not received (NO in operation S190), the add-on storage device determines that the basic storage device 20 is in failure (operation S200). The initial setting information is an example of the control signal transmitted at the predetermined timing, such as the detailed-information obtaining command or log retrieval command described above. The initial setting information includes, for example, information for identifying the add-on storage device, and information for setting a time.

Figure 6:
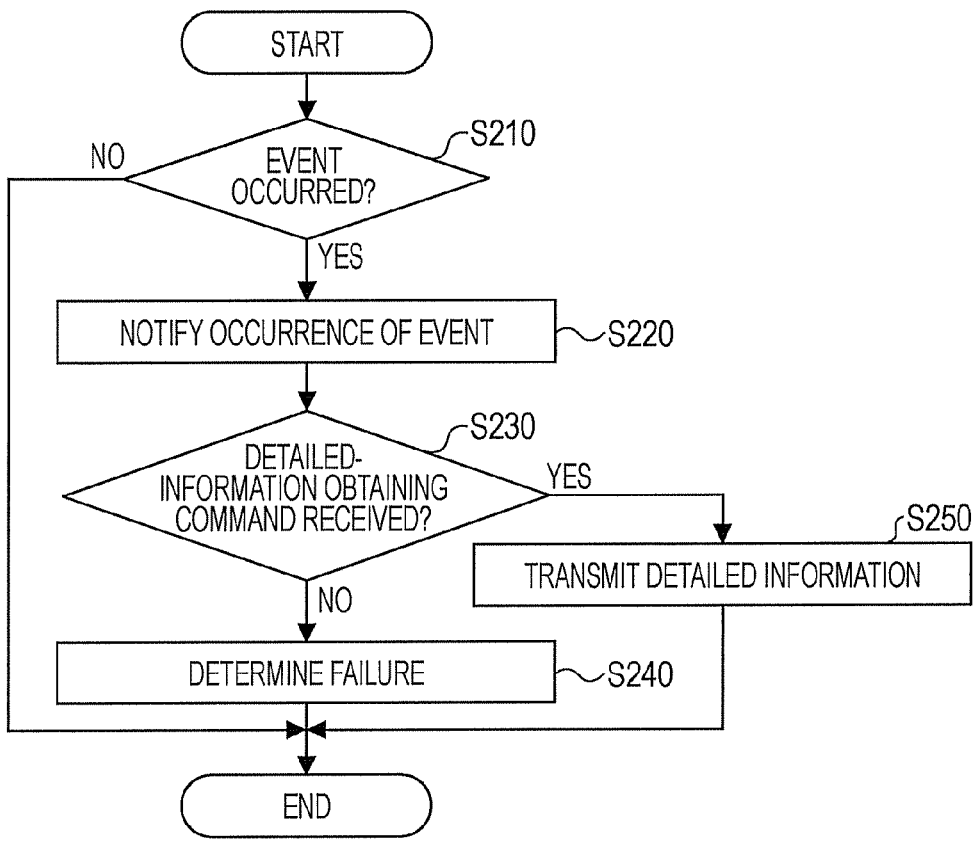
FIG. 6 illustrates an example of a failure determination process.

As illustrated in FIG. 6, furthermore, if an event has occurred in the add-on storage device (YES in operation S210), the add-on storage device notifies the basic storage device 20 of the occurrence of the event (operation S220).

Then, if a detailed-information obtaining command is not received from the basic storage device 20 (NO in operation S230), the add-on storage device determines that the basic storage device 20 is in failure (operation S240). Upon receiving a detailed-information obtaining command (YES in operation S230), the add-on storage device transmits detailed information (operation S250).

Figure 7:
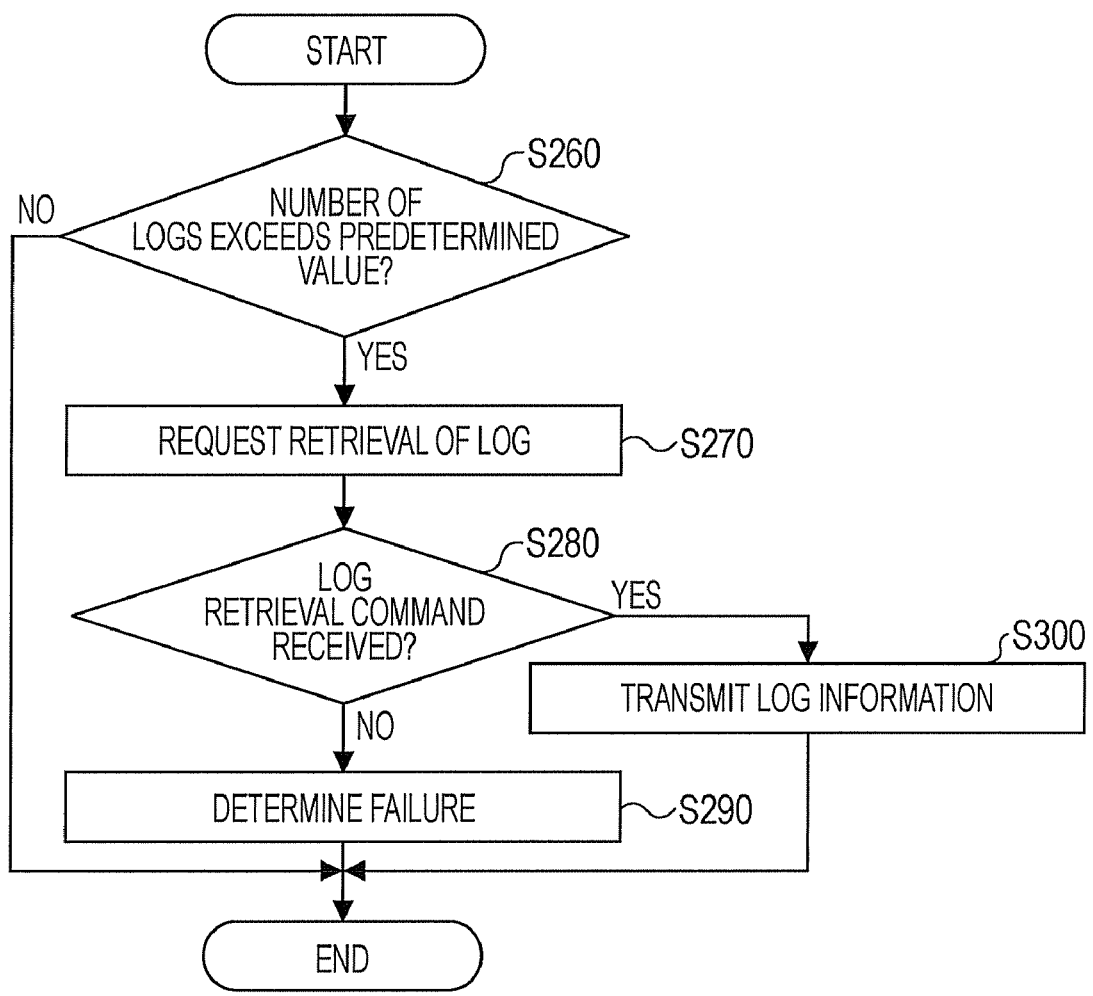
FIG. 7 illustrates an example of a failure determination process.

As illustrated in FIG. 7, furthermore, if the number of logs exceeds a predetermined value (YES in operation S260), the add-on storage device requests the basic storage device 20 to retrieve the logs (operation S270).

If a log retrieval command is not received from the basic storage device 20 (NO in operation S280), the add-on storage device determines that the basic storage device 20 is in failure (operation S290). Upon receiving a log retrieval command (YES in operation S280), the add-on storage device transmits log information (operation S300).

Figure 8:
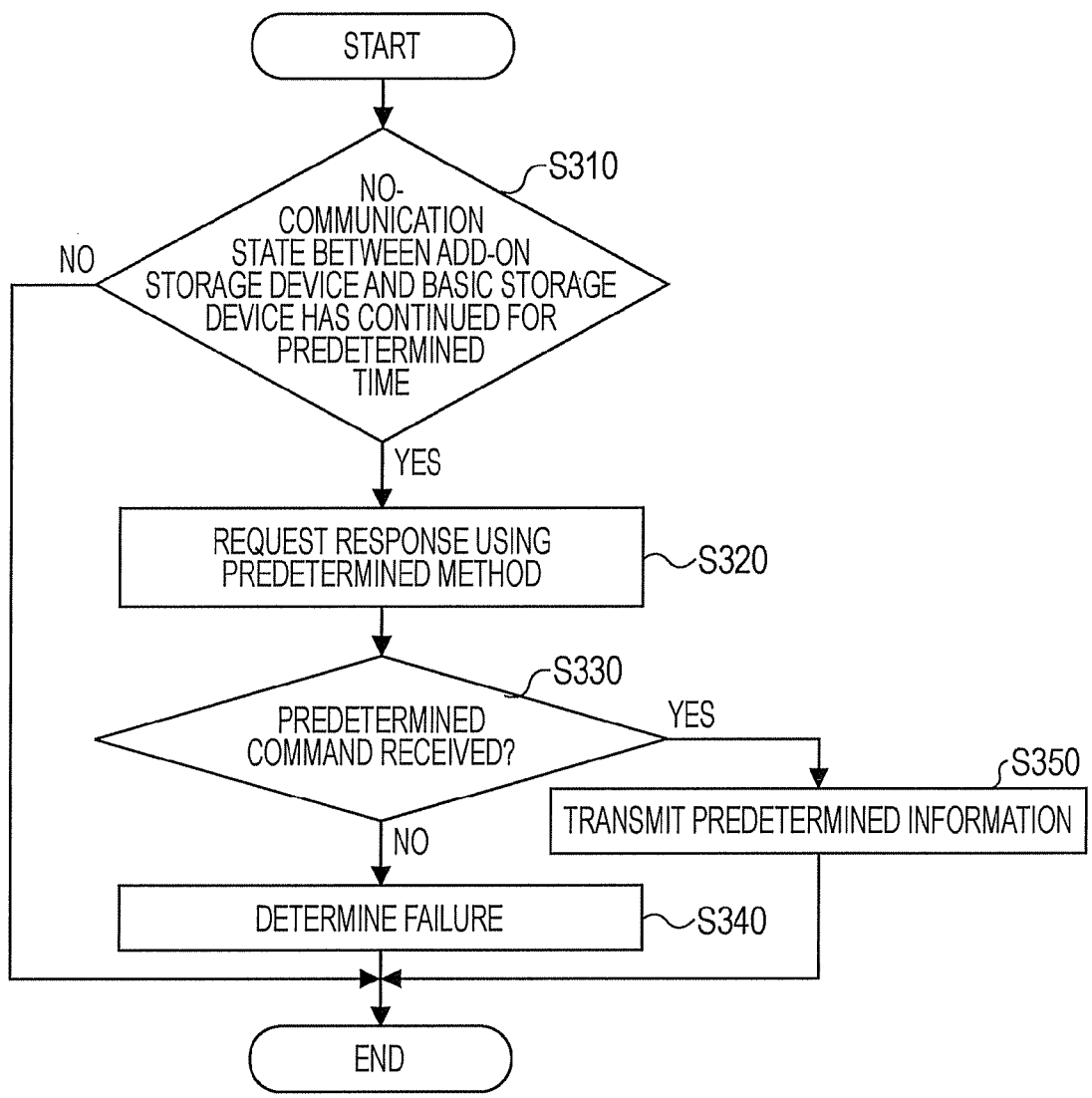
FIG. 8 illustrates an example of a failure determination process.

As illustrated in FIG. 8, furthermore, if no-communication state during which there is no communication with the basic storage device 20 has continued for a predetermined time (YES in operation S310), the add-on storage device requests the basic storage device 20 to transmit a response using a predetermined method (operation S320). Examples of the request for response may include a request to which the basic storage device 20 may respond, such as a request to retrieve logs.

If a predetermined command from the basic storage device 20 is not received (NO in operation S330), the add-on storage device determines that the basic storage device 20 is in failure (operation S340). Upon receiving a predetermined command (YES in operation S330), the add-on storage device transmits predetermined information (operation S350).

As described above, according to an example embodiment, an add-on storage device also receives a second operation stop request that is different from an operation stop request output from a basic storage device to the add-on storage device. The add-on storage device monitors communication from the basic storage device connected upstream thereof or another add-on storage device. If it is determined as a result of the monitoring that the basic storage device is in failure, the add-on storage device determines that a second operation stop request is valid. Then, upon receiving a second operation stop request afterwards, the add-on storage device stops its operation. Therefore, an add-on storage device which is in operation can be stopped even in a case where a basic storage device has failed.

While example embodiments of the present invention have been escribed, the present invention may be implemented in a variety of different forms other than the embodiment described above.

In the embodiment described above, the failure determination process has been described in the context of an example in which the communication state of an add-on storage device is checked to determine whether a no-communication state during which there is no communication with a basic storage device has continued for a predetermined time. In this failure determination process, if the no-communication state has continued for the predetermined time, the add-on storage device requests the basic storage device to make a response using a predetermined method, and determines that the basic storage device is in failure based on the response result. However, the present invention is not limited to the embodiment described above. As an example embodiment, when a no-communication state during which there is no communication with the basic storage device has continued for a predetermined time, it may be determined that the basic storage device is in failure.

According to this embodiment, therefore, the communication state of an add-on storage device may be checked to determine whether a no-communication state during which no communication is received from the basic storage device connected upstream thereof or another add-on storage device has continued for a predetermined time. If it is determined that the no-communication state has continued for the predetermined time, it may be determined that a second operation stop request is valid. Thus, the operation of an add-on storage device which is in operation can be stopped with less processing load on the add-on storage device than a method in which it is determined whether the basic storage device is failure according to a response made by the basic storage device, which is required to make a response in a case where the no-communication state has continued for the predetermined time.

That is, if no response is obtained from the basic storage device in response to the response request, it may be determined that a second operation stop request is valid. This may more reliably ensure that it is determined that the basic storage device is in failure than a method in which it is determined that the basic storage device is failure if the no-communication state has continued for the predetermined time, and it is possible to stop the operation of an add-on storage device which is in operation.

In the embodiment described above, after it is determined that a second stop request signal is valid, the valid second stop request signal is received to thereby stop the operation of the add-on storage device. However, the present invention is not limited to the example embodiment described above. Alternatively, after it is determined that a second stop request signal is valid, even if a valid second stop request signal is not received, the operation of an add-on storage device may be stopped when a predetermined time has elapsed.

In the embodiment described above, once it is determined that the basic storage device is in failure, the validity of a second stop request signal is continued thereafter. However, the present invention is not limited to the embodiment described above. Alternatively, a second stop request signal may be determined to be invalid again at a predetermined timing (for example, when communication from the basic storage device is acknowledged).

The embodiment described above has been described in the context of a storage apparatus in which an add-on storage device is connected in series to a basic storage device. However, the present invention is not limited to the example embodiment described above. Alternatively, an add-on storage device may be connected in parallel to a basic storage device.

The disclosure includes a functional concept of elements of the illustrated apparatus and devices, and elements may not be necessarily physically configured in the illustrated manner. That is, a specific form of distribution and integration of the elements of the apparatus and devices is not limited to the ones illustrated. For example, the operation stop processing unit 120 and the start processing unit 125 may be integrally formed. That is, all or a portion of the elements may be functionally or physically distributed or integrated in arbitrary units in accordance with conditions such as various loads and use status. Furthermore, all or a desired portion of processing functions performed by the apparatus and devices may be implemented by a central processing unit (CPU) and a program interpreted and executed by the CPU, or may be implemented as wired logic-based hardware.

Although a few embodiments have been illustrated and described, it would be appreciated by those skilled in the art that changes may be made in these embodiments without departing from the principles and spirit of the invention, the scope of which is defined in the claims and their equivalents.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A storage apparatus comprising:
a basic storage device including a control unit configured to control external access; and
an add-on storage device configured to be connected to the basic storage device, the add-on storage device comprising:
a first request receiving unit configured to receive a first operation stop request output from the basic storage device to the add-on storage device,
a second request receiving unit configured to receive a second operation stop request different from the first operation stop request received by the first request receiving unit,
a communication monitoring unit monitoring communication from the basic storage device, and
an operation stop processing unit performing processing for stopping the operation of the add-on storage device when the first request receiving unit receives the first operation stop request,
wherein the operation stop processing unit determines the validity of the second operation stop request received by the second request receiving unit based on a monitoring result obtained by the communication monitoring unit, and stops the operation of the add-on storage device when the second request receiving unit determines to the received second operation stop request is valid.

2. The storage apparatus according to claim 1, wherein the communication monitoring unit determines whether a no-communication state during which no communication is received from the basic storage device or a second add-on storage device that connect to the add-on storage device has continued for a predetermined time, and
wherein the operation stop processing unit determines that the second operation stop request received by the second request receiving unit is valid in a case where the communication monitoring unit determines that the no-communication state has continued for the predetermined time.

3. The storage apparatus according to claim 1, further comprising a response request unit transmitting a response request to the basic storage device in a case where the communication monitoring unit monitors communication and determines that a no-communication state during which no communication is received from the basic storage device or the second add-on storage device has continued for a predetermined time,
wherein the operation stop processing unit determines that the second operation stop request received by the second request receiving unit is valid in a case where no response is received from the basic storage device in response to the response request transmitted by the response request unit.

4. The storage apparatus according to claim 1, wherein the operation stop processing unit performs the processing for stopping the operation of the add-on storage device in a case where the second request receiving unit receives no second operation stop request within a predetermined period after it is determined that the second operation stop request received by the second request receiving unit is valid based on a monitoring result obtained by the communication monitoring unit.

5. The storage apparatus according to claim 1, wherein the communication monitoring unit checks a reception state of a command transmitted from the control unit at a predetermined timing, and
wherein in a case where the command is not received in the reception state checked by the communication monitoring unit, the operation stop processing unit determines that the second operation stop request received by the second request receiving unit is valid.

6. A stopping method of stopping operation of an add-on storage device which is in operation in a storage apparatus, the storage apparatus including a basic storage device including a control unit configured to control external access and a storage medium, and the add-on storage device, the add-on storage device being connected to the basic storage device, the stopping method comprising:
requesting receiving a first operation stop request output from the basic storage device to the add-on storage device;
receiving a second operation stop request different from the first operation stop request;
monitoring communication from the basic storage device or a second add-on storage device; and
performing processing for stopping the operation of the add-on storage device when the first operation stop request is received,
wherein in the performing processing for stopping the operation of the add-on storage device, validity of the second operation stop request is determined based on a monitoring result obtained in the communication monitoring and the operation of the add-on storage device is stopped upon determining that a valid second operation stop request is received.

7. The stopping method according to claim 6, wherein in the communication monitoring operation, it is determined whether a no-communication state during which no communication is received from the basic storage device or the second add-on storage device has continued for a predetermined time, and wherein in the operation stop processing operation, it is determined that the second operation stop request received in the second request receiving operation is valid in a case where it is determined in the communication monitoring operation that the no-communication state has continued for the predetermined time.

8. The stopping method according to claim 6, further comprising a response requesting request of transmitting a response request to the basic storage device in a case where it is determined in the communication monitoring that a no-communication state during which no communication is received from the basic storage device or the second add-on storage device has continued for a predetermined time, wherein in the operation stop processing, it is determined that the second operation stop request received in the second request receiving is valid in a case where no response is received from the basic storage device in response to the response request transmitted in the response request.

9. The stopping method according to claim 6, wherein in the operation stop processing, the processing for stopping the operation of the add-on storage device is performed in a case where no second operation stop request is received in the second request receiving within a predetermined period after it is determined that the second operation stop request received in the second request receiving is valid based on a monitoring result obtained in the communication monitoring.

10. An add-on storage device configured to be connected to a basic storage device including a control unit configured to control external access and a storage medium, the add-on storage device comprising:

a first request receiving unit receiving a first operation stop request output from the basic storage device to the add-on storage device;

a second request receiving unit receiving a second operation stop request different from the first operation stop request received by the first request receiving unit;

a communication monitoring unit monitoring communication from the basic storage device or a second add-on storage device; and an operation stop processing unit performing processing for stopping the operation of the add-on storage device when the first request receiving unit receives the first operation stop request, wherein the operation stop processing unit determines validity of the second operation stop request received by the second request receiving unit based on a monitoring result obtained by the communication monitoring unit, and stops the operation of the add-on storage device upon determining that the second request receiving unit receives a valid second operation stop request.

\* \* \* \* \*

UNITED STATES PATENT AND TRADEMARK OFFICE
CERTIFICATE OF CORRECTION

| | |
|---|---|
| PATENT NO. | : 7,949,799 B2 |
| APPLICATION NO. | : 12/196780 |
| DATED | : May 24, 2011 |
| INVENTOR(S) | : Oumar Thielo et al. |

It is certified that error appears in the above-identified patent and that said Letters Patent is hereby corrected as shown below:

Column 10, Line 55, In Claim 6, before "receiving" delete "requesting".

Column 11, Lines 1-2, In Claim 6, after "communication" delete "monitoring" and insert --monitoring,-- therefor.

Signed and Sealed this
Ninth Day of August, 2011

David J. Kappos
*Director of the United States Patent and Trademark Office*